Aug. 15, 1944.   E. W. SHALLOCK   2,356,096
MIXING DISTRIBUTOR
Filed May 14, 1942
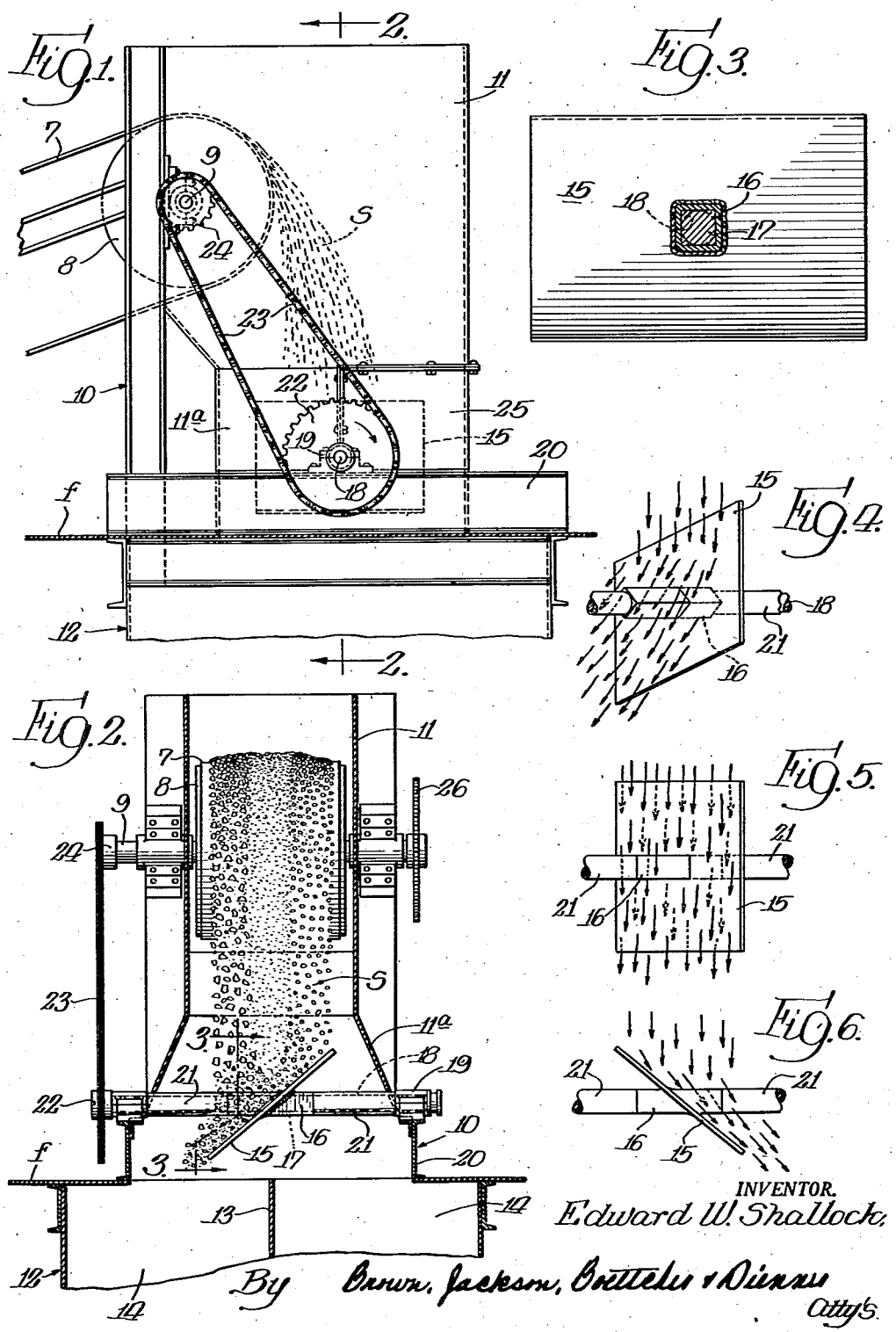
INVENTOR.
Edward W. Shallock,
By Brown, Jackson, Boettcher & Dienner
Attys.

Patented Aug. 15, 1944

2,356,096

UNITED STATES PATENT OFFICE 2,356,096

MIXING DISTRIBUTOR

Edward W. Shallock, Chicago, Ill., assignor to American Ore Reclamation Company, Chicago, Ill., a corporation of New York Application May 14, 1942, Serial No. 442,947

7 Claims. (Cl. 259—18)

This invention relates to a distributor for use in a system or plant for treating various kinds of materials.

In its broader aspects, my invention is well suited for use in plants for treating many kinds of materials such as, for example, cement plants, concrete plants, sintering plants, etc. It is particularly well suited, in certain respects, for use in sintering plants, and I shall describe my invention as used in a sintering plant, by way of example.

In sintering ores, the ore to be sintered is mixed with various other materials, such as coke, limestone aggregates, sinter return fines, flue dust and various other materials, depending upon the nature of the ore, to provide a mix best suited to the desired sintering operation. In a sintering plant employing a plurality of sintering machines, the ore and the other materials to be included in the mix which is to be sintered are stored in bins, the various materials being delivered from the bins in proper proportions, by means of a conveyor system, to a feed hopper from which the materials are delivered to pug mills individual to the sintering machines, in which pug mills the materials are slightly moistened, the materials from each pug mill being delivered to its associated sintering machine. The materials used in forming the mix to be sintered often have widely different physical characteristics and tend to become separated or segregated in the feed hopper. For example, coke delivered on to the conveyor discharging into the feed hopper tends to maintain its position on that conveyor and may be discharged into and collect within the feed hopper at one side thereof, other materials having different physical characteristics than coke tending to collect within the feed hopper at other areas thereof. The result is that the materials discharged into the feed hopper are not effectively mixed together and segregation or separation thereof occurs, the different materials being disposed at different locations or areas within the feed hopper. This hopper is provided at its lower end with a plurality of outlets, one for each pug mill, with associated feeder means for delivering the material from the feed hopper to the pug mill. Due to the segregation of the materials referred to, the material delivered from the feed hopper to one of the pug mills may consist entirely or in large proportion of one material, such as coke, the material delivered to another pug mill may consist of the ore to be sintered without any substantial admixture of other materials, and so on. The result of that is that instead of delivering to the sintering machines a mix of materials best suited for the sintering operation, each of the machines may receive one of the materials only, or a mixture in which one of the materials is present in objectionably large proportion. That is objectionable as rendering difficult the sintering operation with resulting decreased efficiency and output of the sintering machine, as will be obvious. For example, in practice it has been found that in a sintering system or plant of the character referred to, a major portion of the coke may be delivered to one of the sintering machines, causing hot running and burning out of the grates of that machine, there being a deficiency in amount of coke delivered to the other machines, there slowing down the sintering operation and causing unsatisfactory sintering of the material under treatment.

My invention is directed primarily to avoiding the above noted objections with respect to sintering or material treating systems or plants of the general character above mentioned. To that end, I provide means for mixing together the various materials so as to produce a uniform mix in which the materials are distributed uniformly and I then deliver this uniform mix to all of the sintering or material treating machines, thus assuring that each machine receives a mix in which the materials are in the same proportions as in the mix supplied to the other machines. That assures maximum speed and efficiency in the sintering or treating operation, with corresponding increase in efficiency and output of the sintering or treating machines, while, in the case of a sintering plant, guarding against excessive burning or heating or other injury to the sintering machines due to improper proportioning of the materials supplied thereto.

In the known sintering plants above referred to, the materials are delivered by a main feed conveyor in a stream downward into a bin or hopper from which the mixture of materials is delivered to the sintering machines, as above indicated. I have found that by, in effect, taking samples of the falling stream of materials from different cross-sectional areas thereof together constituting a complete cross-section of the stream, and mixing together such samples or portions of the stream, it is possible to obtain a mix in which the materials are uniformly distributed. Broadly stated, my invention comprises means for removing or displacing from the moving stream of materials different areas or portions thereof, together constituting a cross-section of the stream, and directing the portions thus displaced into a receiver or hopper structure so as to produce therein a mix in which the materials are uniformly distributed throughout the cross-sectional area of the hopper structure, the mix thus produced being delivered to the sintering machines, or other material treating means, in a suitable manner. More specifically, I provide a rotating deflecting member effective for displacing from the falling stream different areas thereof as and for the purposes stated. The deflecting member is of a character not to interrupt the flow of the stream of materials, rendering possible continuous operation, which is desirable as being conducive to large output, of importance in sintering operations and in many other operations having to do with treatment of materials. Further objects and advantages of my invention will appear from the detail description.

In the drawing:

Figure 1 is a side view of a distributor embodying my invention, with the associated main feed conveyor and the mix receiving hopper structure shown fragmentarily;

Figure 2 is a sectional view taken substantially on line 2—2 of Figure 1;

Figure 3 is a sectional view, on an enlarged scale, taken substantially on line 3—3 of Figure 2; and Figures 4, 5 and 6 are semi-diagrammatic views of the deflecting plate showing different positions thereof and indicating by arrows the manner in which the falling stream of materials is deflected thereby.

Since the distributor of my invention may be used with a sintering plant of the known type above referred to, or with any other suitable material treating plant, it is not necessary to show the plant in detail, and I have, therefore, restricted the drawing to the distributor, including those parts of the plant which have to do particularly with the distributor.

In the illustrated embodiment of my invention, a main feed conveyor belt 7 passes upward about a head pulley 8 secured on a horizontally disposed pulley shaft 9 rotatably mounted in a suitable known manner on a frame 10 extending above a floor f of the sintering plant. The conveyor discharges the materials to be sintered downward in a stream s into a chute 11 of suitable form and construction appropriately mounted on the frame 10. Chute 11 overlies and opens downward into a hopper structure 12 which may be divided by a partition 13 so as to provide two hoppers 14. It will be understood that but two hoppers are shown by way of example, and that the hopper structure 12 may embody any suitable or desired number of hoppers, within limits, or if desired the hopper structure 12 may be in the form of a single hopper. The hopper structure may be of suitable height and cross-sectional area, and may have associated therewith suitable known means for delivering materials therefrom to the sintering machines of the plant.

Lower portion 11a of chute 11 flares downward to accommodate a deflecting member 15 shown in the form of a rectangular, preferably square, metal plate. Plate 15 is secured, a conveniently by welding, to a tubular square hub 16 which snugly receives the central squared portion 17 of a shaft 18 rotatably mounted in bearing blocks 19 appropriately secured to channel beams 20 of the frame structure 10, extending across the upper end of the hopper structure 12. Spacing sleeves 21 are disposed about shaft 18 between the ends of hub 16 and the bearing blocks 19 and confine plate 15 against movement lengthwise of the shaft. Shaft 18 is driven in a suitable manner, conveniently by means of a sprocket wheel 22 secured on one end thereof and connected by sprocket chain 23 to a sprocket wheel 24 secured on one end of the pulley shaft 9.

When plate 15 is in its position shown in Figures 1 and 2, it is inclined downwardly relative to shaft 18 at an angle of approximately 45 degrees thereto. With plate 15 in its position shown in Figure 2, the falling stream s of materials is deflected by this plate toward the left and into the left hand compartment or hopper 14 of the hopper structure 12. It will be understood from Figure 1 that shaft 18 is rotated in clockwise direction, as viewed in that figure, imparting similar rotation to plate 15 about the axis of the shaft. When plate 15 has been turned through an angle of approximately 45 degrees, from its position shown in Figure 2 into its position shown in Figure 4, the falling stream of materials is deflected thereby downwardly and generally toward the far or rearward edge of the plate as viewed in Figure 4, as indicated by the arrows in that figure. Turning of plate 15 through a further angle of 45 degrees brings it into its position shown in Figure 5. In the latter position of plate 15 the front and the rearward edges thereof are disposed vertically, and the upper and the lower edges are disposed horizontally and at an inclination of 45 degrees to shaft 18. In this position plate 15 splits the falling stream s of materials at an angle of 45 degrees, so that one portion of this stream flows downwardly at one side of the plate as indicated by the full line arrows in Figure 5, and the other portion of the stream falls downwardly at the other side of the plate as indicated by the dotted line arrows in Figure 5. Turning of the plate through a further angle of 90 degrees from its position shown in Figure 5 brings it into its position shown in Figure 6, which is its position opposite to that shown in Figure 2. When plate 15 is disposed as shown in Figure 6, the falling stream of materials is deflected thereby downward and toward the right, as indicated by the arrows, into the right hand compartment or hopper 14 of the hopper structure 12. It will be understood, from what has been said, that plate 15, during rotation thereof, assumes numerous angular positions relative to the falling stream of materials, other than the positions illustrated, and serves to deflect different cross-sectional portions or areas of the falling stream of materials at various and an infinite number of angles. In that manner, during one complete revolution of plate 15, materials are deflected from different areas of the falling stream, which areas, taken together, constitute a complete cross-section of this stream, and these deflected portions of the falling stream are directed into different portions or areas of the hopper structure. Further, in thus deflecting different portions of the stream of materials, the plate 15 serves to cause thorough mixing together of the materials thus deflected. In that manner the materials are uniformly distributed and mixed throughout the cross area of the hopper structure 12, the resulting mix in that structure being such that the materials are uniformly distributed therein. Accordingly, if the hopper structure comprises two or more compartments or hoppers, each of the hoppers will receive a mix in which the materials are uniformly distributed and are in the same proportion as in each of the remaining hoppers. On the other hand, if the hopper structure 12 be in the form of a single hopper, the materials will be uniformly distributed therein and may be delivered therefrom in any suitable manner to the sintering machines, assuring that each machine will receive a mix in which the materials are uniformly distributed and are present in the same proportions as in the mix delivered to the remaining sintering machines.

While I have shown the deflecting member or plate 15 as square and disposed at an angle of approximately 45 degrees to its associated shaft, a deflecting member of any other suitable shape mounted and operated in any other suitable manner for accomplishing the desired purposes may be provided, within the broader aspects of my invention. Also, while the chute 11 preferably is disposed in overlying relation to the hopper structure, as shown and described, it may be otherwise suitably disposed as circumstances may require, with suitable provision for delivering the materials from the deflecting means to the hopper structure. The employment of a continuously rotating or driven deflecting means is advantageous as preventing interference with the continuous flow of the stream of materials to be uniformly distributed and mixed together for sintering or other treatment, thus permitting of continuous operation of the conveyor or analogous means delivering these materials to the chute, which is conducive to maximum output, an important consideration in the material treating field. It will be understood that the shaft 18 is driven at proper speed relative to the head pulley 8 of the conveyor to accomplish the desired deflecting and mixing of the materials, and that any suitable means, such as a removable section 25 of chute 11, may be provided for giving ready access to plate 15 and the parts associated therewith, to facilitate removal and replacement of that plate. Head pulley shaft 9 may be driven in any suitable manner, conveniently by means of a sprocket wheel 26 secured on the other end thereof and driven in any known suitable manner.

I claim:

1. In a mixing distributor for supplying to a plurality of machines a mixture of materials to be treated, a plurality of hoppers, a chute overlying and discharging downward into said hoppers, means for delivering the materials downward into said chute in a stream, and a unidirectional rotating deflecting plate disposed in the path of and at an inclination to the falling stream of materials to split the same, said plate being generally edgewise to the falling stream of materials and of such extent that its edge progressively traverses the stream for substantially the full width thereof and alternately from one side to the other side of the stream during rotation of said plate.

2. In a mixing distributor for supplying to a plurality of machines a mixture of materials to be treated, a plurality of hoppers, a chute overlying and discharging downward into said hoppers, conveyor means comprising a head pulley rotatable about a horizontal axis and a belt passing about said pulley disposed to deliver the materials downward into said chute in a stream, a shaft below said pulley rotating about a horizontal axis, and a deflecting plate mounted on said shaft for rotation therewith inclined thereto and disposed in the path of and to split the falling stream of materials.

3. In a mixing distributor for supplying to a plurality of machines a mixture of materials to be treated, a plurality of hoppers, a chute overlying and discharging downward into said hoppers, a pulley shaft mounted for rotation about a horizontal axis, a head pulley secured on said shaft, a conveyor belt travelling about said pulley disposed to deliver the materials downward into said chute in a stream, a second shaft rotatably mounted below and parallel with and driven by said pulley shaft, and a deflecting plate mounted on said second shaft for rotation therewith inclined thereto and disposed generally edgewise to and in the path of the falling stream of materials.

4. A mixing distributor of the character described comprising, means for discharging a plurality of materials to be mixed together downward in a stream, a deflecting and mixing plate mounted for rotation about an axis substantially normal to the falling stream of materials, said plate being inclined transversely of its axis of rotation and disposed in the path of and to intersect and split said stream of materials and thereby deflect different portions of the falling stream of materials at varying angles during rotation of said plate, and means for rotating said plate about said axis in one direction.

5. A mixing distributor of the character described comprising, means for discharging a plurality of materials to be mixed together downward in a stream, a shaft mounted for rotation about a substantially horizontal axis, a deflecting and mixing plate mounted on said shaft for rotation therewith and inclined relative thereto, said plate being disposed in the path of and to intersect and split said stream of materials and thereby deflecting different portions of the falling stream of materials at varying angles during rotation of said plate, and means for rotating said shaft in one direction.

6. In a mixing distributor of the character described, means for discharging a plurality of materials to be mixed together downward in a stream, a deflecting and mixing plate disposed below said means generally edgewise to and to intercept the falling stream of materials, and means for imparting unidirectional rotation to said plate about an axis located centrally thereof in angular relation thereto and substantially normal to the falling stream of materials, said plate at all times presenting to said falling stream of materials an area of deflection substantially equal to the cross sectional area of said stream whereby the edge of said plate in the rotation thereof traverses the falling stream of materials for substantially the full width of the latter and alternately from one side to the other thereby splitting the stream into an infinite number of parts transversely and deflecting the split portions of the stream in opposite directions laterally thereof.

7. In a mixing distributor of the character described, means for discharging a plurality of materials to be mixed together downward in a stream, a deflecting and mixing plate disposed below said means generally edgewise to and to intercept the falling stream of materials, and means for imparting unidirectional rotation to said plate about an axis extending through said plate at an angle to the plane thereof and substantially normal to the falling stream of materials, said plate being of such extent that the edge thereof in the rotation of said plate progressively traverses the falling stream of materials for substantially the full width of the latter thereby splitting the stream into an infinite number of parts transversely and deflecting the split portions of the stream in opposite directions laterally thereof.

EDWARD W. SHALLOCK.